United States Patent
Koeppler et al.

(10) Patent No.: US 6,849,242 B1
(45) Date of Patent: Feb. 1, 2005

(54) POROUS SILICA GRANULE, METHOD FOR PRODUCING THE SAME, AND METHOD FOR PRODUCING SYNTHETIC QUARTZ GLASS POWDER USING THE POROUS SILICA GRANULE

(75) Inventors: Rainer Koeppler, Seligenstadt (DE); Fritz-Ulrich Kreis, Geinhausen (DE); Klaus Arnold, Hanau (DE); Hiroshi Matsui, Takefu (JP); Kasumi Hoshikawa, Koriyama (JP); Tsukasa Sakaguchi, Koriyama (JP)

(73) Assignees: Heraeus Quarzglas GmbH & Co. KG, Hanau (DE); Shin-Etsu Quartz Products Co., Ltd., Tokyo (JP)

( * ) Notice: Subject to any disclaimer, the term of this patent is extended or adjusted under 35 U.S.C. 154(b) by 707 days.

(21) Appl. No.: 09/672,438

(22) Filed: Sep. 28, 2000

(30) Foreign Application Priority Data

Sep. 28, 1999 (JP) .......................................... 11-273736
Sep. 28, 1999 (JP) .......................................... 11-273752
Sep. 28, 1999 (JP) .......................................... 11-273753

(51) Int. Cl.$^7$ .............................................. C01B 33/12
(52) U.S. Cl. ....................... 423/338; 423/335; 65/17.3; 65/21.1; 501/54
(58) Field of Search ................................ 423/335, 336, 423/338; 65/17.2, 17.3, 21.1, 33.1, 440; 501/54

(56) References Cited

U.S. PATENT DOCUMENTS

| | | | | |
|---|---|---|---|---|
| 3,383,172 A | * | 5/1968 | Biegler et al. | 423/335 |
| 4,042,361 A | * | 8/1977 | Bihuniak et al. | 65/17.5 |
| 4,126,422 A | * | 11/1978 | Brandes | 23/293 R |
| 4,528,163 A | * | 7/1985 | Albrecht | 117/208 |
| 5,030,433 A | * | 7/1991 | Mehrotra | 423/335 |
| 5,145,510 A | * | 9/1992 | Saito et al. | 65/17.2 |
| 5,516,350 A | * | 5/1996 | Onoda et al. | 65/17.2 |
| 5,643,347 A | * | 7/1997 | Werdecker et al. | 65/21.1 |
| 5,683,483 A | * | 11/1997 | Yosiaki et al. | 65/102 |
| 5,979,186 A | | 11/1999 | Koppler et al. | 65/21.1 |
| 6,129,899 A | * | 10/2000 | Katsuro et al. | 423/338 |

FOREIGN PATENT DOCUMENTS

| | | |
|---|---|---|
| JP | A-Hei 717706 | 1/1995 |
| JP | 09165214 | 12/1995 |
| JP | 10101324 | 4/1998 |
| JP | A-Hei 11130417 | 5/1999 |

* cited by examiner

Primary Examiner—Stanley S. Silverman
Assistant Examiner—Colleen P. Cooke
(74) Attorney, Agent, or Firm—Milde & Hoffberg LLP

(57) ABSTRACT

The granule consists of individual granules approximately spherical in shape, having a pore volume of 0.5 cm$^3$, a mean diameter of pores of 50 nm or less, a specific surface area of 100 m$^2$/g or less, and a bulk density of 0.7 g/cm$^3$ or higher. It is produced by dispersing a fumed silica obtained by hydrolysis of a silicon compound into pure water to obtain a slurry, and drying the slurry. The granule is used for producing high purity synthetic quartz glass powder. The method further comprises: a first heat treatment under an oxygen-containing atmosphere, a second heat treatment in a temperature range of from 600 to 1100° C., and a third heat treatment in a temperature range of from 1100 to 1300° C. under an atmosphere containing hydrogen chloride; and a step of densification comprising calcining the product at a temperature not higher than 1500° C. under vacuum or in an atmosphere of gaseous hydrogen or gaseous helium. To calcine the powder without causing fusion adhesion of the particles, bubbling fluidization of said porous silica granule is conducted by supplying gaseous helium and calcining thereof in a temperature range of from 1000 to 1600° C.

40 Claims, 1 Drawing Sheet

POROUS SILICA GRANULE, METHOD FOR PRODUCING THE SAME, AND METHOD FOR PRODUCING SYNTHETIC QUARTZ GLASS POWDER USING THE POROUS SILICA GRANULE

FIELD OF APPLICATION

The present invention relates to porous silica granule with high purity and a method for producing the same, and to a method for producing a high purity synthetic quartz glass powder using the porous silica granule. And in further detail, it relates to a low cost method for producing high purity synthetic quartz glass powder that is used as the raw material for producing quartz glass useful in the semiconductor industry.

Furthermore the present invention relates to a method for producing synthetic quartz glass powder comprising calcining porous silica granule by bubbling fluidization.

PRIOR ART

Porous silica granules have been used as a starting material for producing synthetic quartz glass powder, a catalyst carrier, or as a filler material utilized in semiconductor industry. However, with the recent trend in increasing integration of semiconductor devices, quartz glass having still higher purity and quality is required; but the purity and the quality achievable by a quartz glass using the naturally occurring quartz glass or silica sand as the raw material are now hitting the highest limit. Accordingly, synthetic quartz glass is now attracting attention. Such a synthetic quartz glass can be produced by, for example, a sol-gel method comprising size-reducing a gel body obtained by hydrolysis of a high purity silicon alkoxide and the like, or a method comprising depositing fine silica particles obtained by flame hydrolysis of a high purity silicone compound (such as silicone tetra chloride or silane, (hereafter referred to as the "soot method"), followed by calcining the resulting body into synthetic quartz glass, and size-reducing it. However, the conventional production methods of the sol-gel method and soot method above both comprise preparing a bulk body, followed by size-reduction and purification to obtain a quartz glass powder. Accordingly, the production methods above suffer a problem of incorporating impurities during the size reduction and the like, resulting in a synthetic quartz glass having an insufficient purity. In the case of sol-gel method, in particular, the use of a compound containing carbon, such as silicon alkoxide, as the starting material, incorporates carbon component into the porous silica granules at a concentration amounting to as high as several percent. Thus, this was a cause for forming residual black foreign matter or generating pores in the synthetic quartz glass, and this made the product unfeasible as a starting material for use in the semiconductor industry in which high purity and high quality were required. In the case of the sol-gel method, furthermore, solvent and water are included in a large quantity, and the gel obtained by evaporation becomes so porous as to contain pores from about 0.1 to 20 $\mu$m in diameter, which are enclosed inside the glass particles during the densification performed by calcining. Such pores cause disadvantages, because they expand during the semiconductor process in which treatments are performed at a high temperature under a reduced pressure as to generate large pores. On the other hand, a soot method can be freed from such problems of residual carbon components and the like ascribed to carbon impurities by using a carbon-free raw material, and hence the product can be obtained free of contamination by the carbon components. However, it suffers a low production efficiency and a high manufacturing cost because the production of the bulk body is accompanied by the generation of by-products in large quantities.

As a method for utilizing the large amount of by-products, there are known methods comprising dispersing the silicate dust in water and preparing the granule, as disclosed in, for instance, JP-A-Hei7-17706 or in JP-A-Hei11-130417. However, the methods described therein include a step of size-reduction and the like for the preparation of silica granules; accordingly, impurities are inevitably incorporated, and hence, these methods were found still unsatisfactory.

Usually for the calcining of the prorous silica powder, a quartz glass crucible and the like has been used, and, in general, the porous silica granule is fed therein and heated. However, in the calcining methods above, there is a problem of incorporating impurities during the size reduction because the powder particles undergo fusion with each other, and this led to a disadvantage that a synthetic quarts glass having sufficiently high purity becomes unfeasible.

SUMMARY OF THE INVENTION

Because the soot method does not contain any residual carbon components and the method minimizes the pore diameter and thereby increases the bulk density, it was presumed possible to obtain a synthetic quartz glass further improved in purity and quality.

Thus, it is an object of the present invention to provide a high purity porous silica granule.

It has been found that porous silica granules having high purity and high quality and having no impurity incorporated therein can be realized by drying, under specified conditions, a slurry obtained by dispersing fumed silica prepared by hydrolyzing a silicon compound in pure water, and that by calcining the resulting granules, it was possible to implement a high purity synthetic quartz glass powder. Furthermore, it has been found that the silica granules above can be obtained by making use of a silicate dust that is generated in a large quantity as a by-product during the production of the synthetic quartz glass.

A further object of the present invention is to provide a high purity synthetic quartz glass powder using the porous silica granule above, whereby the quartz glass powder is free from contamination due to the carbon components or to the size reduction and purification processes.

Another object of the present invention is to provide a method for producing a synthetic quartz glass powder having high purity and high quality, which enables calcining the powder without causing fusion adhesion of the particles.

Another object of the present invention is to provide porous silica granule, which is free from causing shrinking during the production of quartz glass.

A further object of the present invention is to provide a production method for high purity and high quality synthetic quartz glass. The present invention has been accomplished on these findings.

As a means for overcoming the problems above, the present invention provides to a porous silica granule approximately spherical in shape, having a carbon concentration of less than 1 ppm, a pore volume of a maximum of about 0.5 per 1 gram of the granule, a mean diameter of pores of a maximum of about 50 nm, a specific surface area of a maximum of about 100 m$^2$/g, and a bulk density of at least about 0.7 g1cm³, to a method for producing the same, to a method for producing a high purity synthetic quartz glass powder using the porous silica granule above and to a method for producing high purity synthetic quartz glass using said high purity synthetic quartz glass powder.

The porous silica granule according to the invention comprises pores having an average pore size of 50 nm or less. Moreover, in producing the synthetic quartz glass powder from the granule, the pores diminish inside of the granule without being sealed as closed pores during calcining. Furthermore, not only the pore volume is as small as a maximum of about 0.5 cm³ per 1 gram of the granule, but also the specific surface area is as small as a maximum of about 100 m²/g, and the bulk density is at least a minimum of about 0.7 g/cm³. Thus, when the granule is used in producing bulk quartz glass, the product can be obtained without any shrinking, and, because all the individual silica granules are uniform and spherical in shape, the granules exhibit similar calcining and melting behavior. Thus, since calcining, melt vitrification, etc., can be easily performed, the granule need not be first calcined into quartz glass powder, but it can be directly shaped into a bulk transparent quartz glass. Furthermore, because the individual porous silica granules are of high purity and are uniform, they are useful as a catalyst carrier or as a filler material for use in semiconductors.

As described above, the porous silica granule according to the present invention preferably is silica granule prepared by using as a material fumed silica obtained by hydrolyzing a silicon compound (soot method).

In producing such a silica granule, the fumed silica is dispersed in pure water to obtain a slurry having a solid concentration in a range of from 50 to 80% by weight, followed by adding a mineral acid therein to control the pH value of the slurry in a range of from 1 to 4, and, while stirring the resulting slurry, a heated drying gas is supplied thereto to dry the slurry. During drying, the slurry gradually becomes sticky, and it gradually changes into uniform spherical, individual porous granules by the shearing force and the rotation applied by the stirring, whereby the water content is reduced to a maximum of about 20% by weight.

Although the size of the individual granules depends on the stirring speed, the flow rate of the heated gas, flow rate, and the humidity, the rate of water evaporation is preferably set to 50 g1hour or lower per 1 kg of the original slurry. A rate of evaporation of water exceeding the range defined above is not preferred, because the water incorporated inside the granules may boil to break the granules.

Preferably during drying, classification is performed at the point the water content is reduced to a maximum of about 1% by weight to form porous silica granules having a particle size in a range of from 50 to 800 tim, preferably from 180 to 500 µm.

As the heated drying gas for use in drying the slurry above, for instance, there can be used a clean air and the like treated by a HEPA filter and the like. The drying gas is preferably heated to a temperature range of from 80 to 150° C.

To realize a slurry with a sufficiently high viscosity, the fumed silica above should have an average particle diameter of a maximum of about 4 µm, preferably, a maximum of about 1 µm. As the mineral acid to be added to the slurry, there are no particular limitations so long as it is volatile acid, and there can be used, for instance, hydrochloric acid or nitric acid. In case of using a chloride of silicon as material, the use of hydrochloric acid is preferred because hydrogen chloride which is generated as a by-product of the hydrolysis may dissolve into the slurry in a certain amount.

Preferably, the fumed silica is based on silicon compounds such as silicon tetrachloride, disilicon hexachloride, silicon tetrabromide, silicon tetraiodide, hexadichlorosiloxane, irichlorosilane, tribromosilane, trisilane, etc., and having a carbon concentration of less than 1 wt.-ppm (thereby free from inconveniences attributed to the carbon components).

Usually, the porous silica granule is prepared by the flame hydrolysis method as described above. This method is preferred because the raw material is carbon-free and thereby contains no residual carbon component and because it can be prepared without size-reducing a bulk body. However, according to a further preferred embodiment according to the present invention, porous silica granule is prepared by a sol-gel method, comprising preparing a wet gel body by reacting high purity alkoxysilane with water; drying the resulting body and size-reducing it thereafter; and applying a purification treatment such as the removal of carbon component.

The porous silica granule may be used to prepare a high purity quartz glass powder. The method for preparing a synthetic quartz glass powder by using porous silica granules as described above comprises, a step of heat treatments of heating said silica granule comprising performing a first heat treatment in a temperature range of from 150 to 300° C. under an oxygen-containing atmosphere, a second heat treatment of heating in a temperature range of from 600 to 1100° C., and a third heat treatment in a temperature range of from 1100 to 1300° C. under an atmosphere containing hydrogen chloride; and a step of densification, comprising calcining the silica granules at a temperature not higher than 1500° C. under vacuum or in an atmosphere of gaseous hydrogen or gaseous helium.

The silica granule above is heated to a temperature in a range of from 150 to 300° C. in an oxygen-containing atmosphere, so that the fine powder adhered to the surface of the individual granules by the reaction with water can be discharged out of the system, while completely removing the water remaining inside the granules. A temperature exceeding 300° C. is not preferred, because cracks generate on the individual silica granules.

Then, heat treatment is performed in the temperature range from 600 to 1100° C. to remove the organic matter and combustibles incorporated inside the granules by oxidation. A temperature exceeding 1100° C. is not preferred, because partial enclosure of the pores occurs. A temperature lower than 600° C. is also not preferred, because it is difficult to completely remove the organic matter and the combustibles.

Finally, a heat treatment is performed in a temperature range of from 1100 to 1300° C. under an atmosphere containing hydrogen chloride to remove trace amount of metallic impurities contained inside the granules in the form of chlorides. In the step of removing metallic impurities, the temperature is preferably set as high as about 1200° C. to accelerate the reaction rate. At this temperature, pore closing starts to occur, but this causes no problem in particular because the impurities are completely removed.

The porous silica granule subjected to heat treatment is then calcined inside an electric furnace at a temperature not higher than 1500° C., preferably in the temperature range from 1300 to 1500° C., under vacuum or in gaseous hydrogen or helium atmosphere, so that it may be densified to become a quartz glass powder. As the electric furnace for use in the heat treatment, preferred are furnaces made of high purity quartz glass or ceramics. To perform the heat treatment and the densification treatment, the silica granule is placed inside the furnace, heated at a uniform heating rate, and is maintained for a predetermined duration of time. A temperature exceeding 1500° C. during the densification treatment is not preferred, because sintering occurs among the individual silica granules and further crushing is required.

In another preferred embodiment of the method for producing high purity synthetic quartz glass powder according to the present invention, the porous silica granules are fed inside a heat-resistant fluidized heating cell, and the entire cell is placed inside an electric furnace, so that the heating and calcining is performed in the temperature range of from 1300 to 1600° C. while introducing therein gaseous helium to conduct bubbling fluidization (fluid bed). As the fluidized heating cell for use in the method, preferred are those made of quartz glass or ceramics. More preferably, there is used a vertical type quartz glass fluidized heating cell having a vertical gas dispersion plate provided with a plurality of gas penetrating holes at the lower portion thereof.

The porous silica granule that is introduced inside the fluidized heating cell preferably has a particle diameter in a range of from 50 to 800 mm. If the particle diameter of the powder is less than the range defined above, the fluidization occurs so vigorously that the powder to be treated may boil out of the cell and thereby reduce the process efficiency. On the other hand, if the particle diameter of the powder should exceed the range defined above, the fluidization occurs only insufficiently so as to make uniform calcining unfeasible. A gas other than gaseous helium is not preferred, because it may reside inside the powder and cause pores.

The fluidized heating cell above is set inside the electric furnace and is heated to a temperature range of from 1300 to 1600° C. from the outer periphery. In case it is produced statically, a temperature not higher than 1450° C. is selected because fusion of powder particles may occur if the treatment should be performed at a temperature higher than this range. However, in case a fluidized heating cell is used, a denser quartz glass powder can be obtained because calcining can be performed at higher temperatures. If a porous silica granule prepared by the sol gel method is used, the heating temperature should be lower than 1500° C. However, even if a porous silica granule prepared by the flame hydrolysis method should be used, a heating temperature exceeding 1600° C. is not preferred because it causes the quartz glass powder to soften and to fusion adhesion to the fluidized heating cell made of quartz glass.

As described above, in the method for producing synthetic quartz glass according to the present invention, the temperature raise is initiated while applying bubbling fluidization to the porous silica granule. Accordingly, the porous silica granule provided inside the cell can be uniformly heated and calcined, thereby a dense and transparent quartz glass powder can be obtained without suffering fusion adhesion.

The heat efficiency can be further improved by introducing gaseous helium previously heated to a temperature of 600° C. or higher, preferably 1000° C. or higher.

Furthermore, by circulating gaseous helium, the production cost can be further reduced.

A high purity quartz glass is produced by fusing and vitrifying such obtained quartz glass powder as a starting material:

The embodiment of the present invention is described below, but the present invention is not limited thereby.

Figure 1:
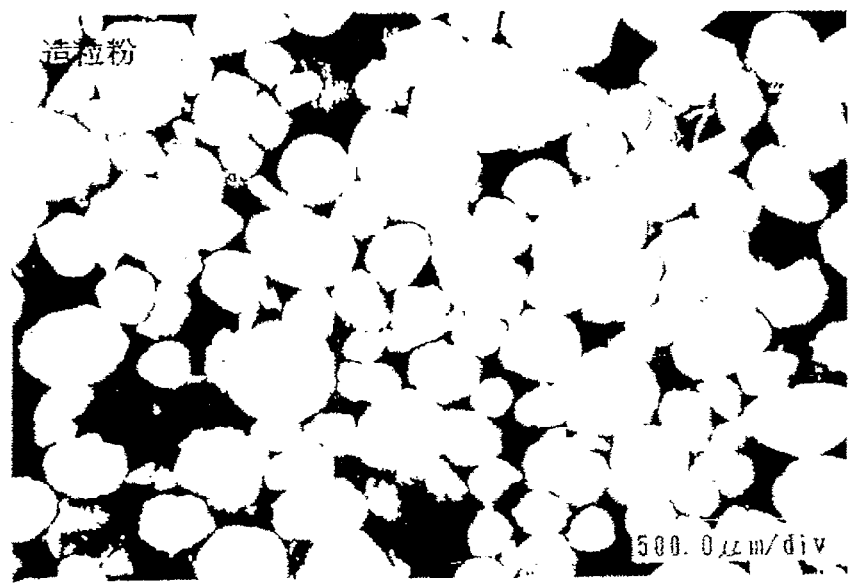
FIG. 1 is a microphotograph of porous silica granules according to the present invention.

The values of specific surface area, pore volume, average pore diameter, and the concentration of the impurities were obtained by the measuring methods as follows.

In the following examples, the following methods were used to determine the properties indicated:

(a) Specific surface area: BET method (b) Pore volume: Gas adsorption method (DH method)

(c) Concentration of the impurities: IPC-AES method and infrared absorption spectroscopy.

EXAMPLE 1

Preparation of Dry Porous Silica Granule

Fumed silica was generated by combusting an oxyhydrogen flame using a quartz glass burner inside a reaction chamber made of quartz glass, and supplying a high purity silicon tetrachloride. The fumed silica in the gas discharged from the outlet was recovered with a bag filter to obtain 140 kg of fumed silica.

A stirrer whose inside and stirring blade are covered with a polyurethane resin was set, and 75 liter of pure water was placed therein. While rotating the stirring blade, fumed silica was gradually fed therein to prepare a slurry having a concentration of 65% by weight. Then, 200 cm$^3$ of hydrochloric acid of semiconductor grade was added therein, and stirring was continued for about 30 minutes to stabilize the slurry. A vessel about 1 m in diameter whose inner surface is similarly covered with polyurethane was prepared, and after setting therein stirring jig and scraper made of quartz glass, slurry was fed therein to start the rotation of the stirring jig and the stirring vessel. While supplying dry clean air heated to 150° C. at a flow rate of 5 m$^3$ min to the surface of the slurry being stirred, drying was continued for 30 hours. The slurry became sticky after 8 hours, and after 16 hours, granules were obtained even though water remained therein at a content of about 20% by weight. After 30 hours, the water content decreased to about 0.6% by weight. The granules thus obtained were classified to obtain 70 kg of granules 180 to 500 μm in particle diameter. The granules thus obtained were found to be spherical in shape and uniform, having a specific surface area of 55 m$^2$/g, a pore volume of 0.307 cm$^3$/g and an average pore diameter of 11.2 nm. The concentration of the impurities is shown in Table 1 in a unit of wt.-ppm.

TABLE 1

| Li | Na | Mg | Al | K | Ca | Fe | Cu | B |
| --- | --- | --- | --- | --- | --- | --- | --- | --- |
| <0.05 | <0.05 | <0.05 | <1 | <0.05 | <0.05 | 0.25 | <0.05 | 0.01 |

Heat Treatment

Then, the granule obtained above was flown inside a rotary kiln, and an oxidation treatment thereof was performed under an atmosphere of flowing oxygen at 200° C. and at a flow rate of 150 cm$^3$/min. The rate of treatment was 12 kg/hour, and the time duration for passing inside the furnace was about 30 minutes. After performing the second heat treatment under similar conditions except for setting the temperature to 800° C., the temperature was elevated to 1200° C. to carry out the next heat treatment under an atmosphere of flowing gaseous hydrogen chloride at a rate of 150 cm³/min. The rate of treatment was 10 kg/hour, and about 40 minutes was necessary for the passage inside the furnace. The granules thus obtained yielded a specific surface area of 49 m²/g, a pore volume of 0.27 cm³/g and an average pore diameter of 11.7 nm. The concentration of the impurities of the resulting silica granule is given in Table 2, in a unit of wt.-ppb.

TABLE 2

| Li | Na | Mg | Al | K | Ca | Fe | Cu | B |
|----|----|----|----|----|----|----|----|----|
| <2 | 5 | 5 | 15 | 5 | 10 | 10 | <5 | 10 |

Calcining

Ten kilograms of the porous silica granule completed with the heat treatment was placed inside a quartz glass vessel, and was inserted inside a vacuum furnace equipped with a carbon resistor type heater. After once evacuating the inside of the furnace to vacuum, gaseous helium was introduced inside the furnace to realize a helium atmosphere. After once elevating the temperature of the furnace to 1200° C. at a heating rate of 20° C./min, the heating rate was lowered to 1° C./min to 1380° C., and the temperature was held at 1380° C. for 6 hours. Then, the furnace was left to cool naturally. The quartz glass powder taken out from the furnace was found to be free of fusion of the particles, and a complete powder was obtained by pressing the aggregate. No pores were detected in the transparent quartz glass powder thus obtained, and the true specific gravity thereof was found to be 2.18.

The synthetic quartz glass powder was fused in vacuum to produce quartz glass rods and blocks. No bubbles, foreign matter, etc., were found in the thus obtained quartz glass rods and blocks, and no expansion of pores was found to occur even when heat treatment was performed in vacuum at 1600° C.

EXAMPLE 2

After the same preparation of the silica granule and the same heat treatment as described for Example1, an alternative method for calcining was performed.

Calcining

Figure 2:
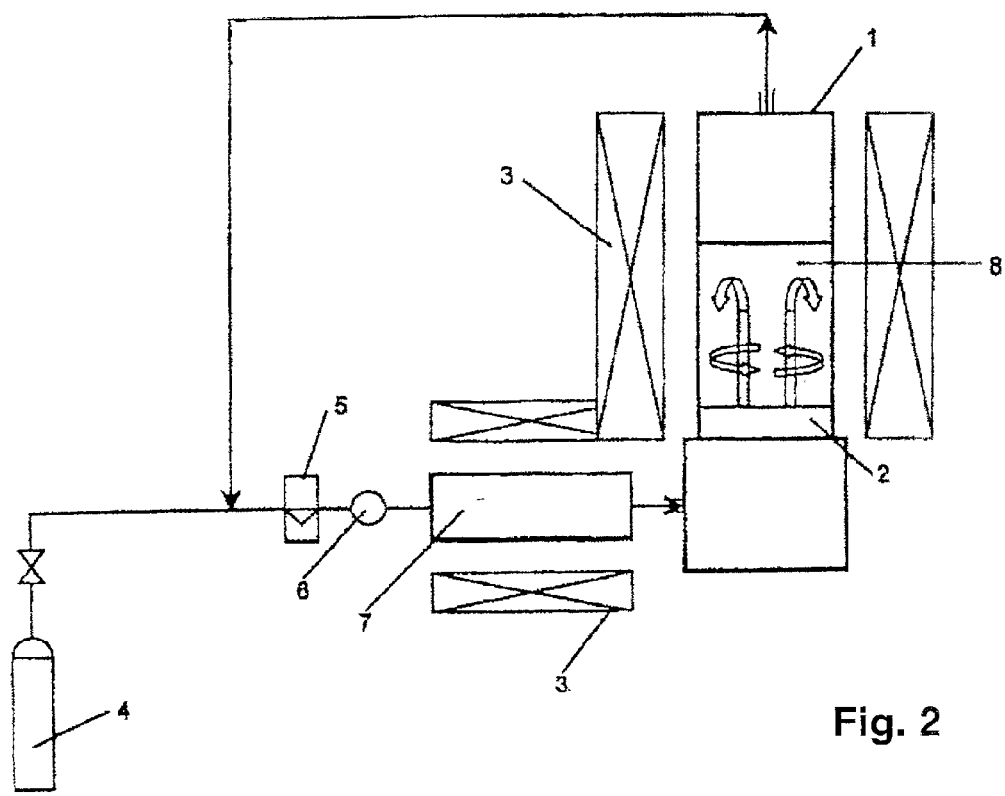
FIG. 2 is a diagram showing a helium gas flow circulation for the production process of a synthetic quartz glass powder according to Example 2.

The porous silica granule subjected to heat treatment above was calcined in accordance with the process shown in the flow sheet given in FIG. 2.

In FIG. 2 are shown: a vertical fluidized heating cell 1, a gas dispersion plate 2, a heater 3, a helium gas storage bomb 4, a gas flow meter 5, a gas pressure gauge 6, a gas heating furnace 7, and a powder filled layer 8. The silica granule was fed into the vertical fluidized heating cell 1, and was set inside a vertical electric furnace, and was heated from the outer periphery with a carbon resistance type heater. Gaseous helium was supplied from the lower portion of the vertical type fluidized heating cell at a rate of 30 liters/minute with the initiation of heating, so that the porous silica granule may be subjected to bubbling fluidization. The gaseous helium was heated to 1000° C. and supplied into the heating furnace 7 at the point the temperature of the porous silica granule reached 1000° C. The temperature of the vertical fluidized heating cell was elevated from the room temperature to 1200° C. at a rate of 20° C./min, and was then further raised to 1550° C. at a rate of 20° C./min. After holding the temperature at 1550° C. for a duration of 10 hours, the cell was left to cool naturally.

The synthetic quartz glass powder taken out of the furnace was found to be completely transparent, and it was found to be calcined into a powdery state consisting of particles free from fusion with each other. No pores were detected in the transparent quartz glass powder, and the true specific gravity thereof was found to be 2.18 g/cm³.

A quartz glass rod and a block material were produced by vacuum fusion of the synthetic quartz glass powder thus obtained. No bubbles, foreign matter, etc., were found in the thus obtained quartz glass rods and blocks, and no expansion of pores was found to occur even when heated in vacuum at 1600° C.

The porous silica granules according to the present invention are not only uniform and of high purity, but they yield a small pore diameter, a small pore volume, a small specific surface area, and a high bulk density. Accordingly, they do not undergo shrinking during the production of quartz glass. Furthermore, because the porous silica granules are of high purity and yield a high bulk density, they are also useful as a filler material for semiconductors. Furthermore, the porous silica granules are of high industrial value because they allow the use of by-products which are generated during the production of synthetic quartz glass.

As explained in Example 2 in more detail, the method for producing synthetic quartz glass according to the fluidized bed method enables calcining a powder without causing fusion adhesion, thereby realizing a synthetic quartz glass powder having high purity and high quality.

What is claimed is:

1. A, porous silica granule approximately spherical in shape, having a carbon concentration of less than 1 wt.-ppm, a pore volume of 0.5 cm³ or less per 1 gram of the granules, a mean diameter of pores of 50 nm or less, a specific surface area of 100 m²/g or less, and a bulk density of 0.7 g/cm³ or higher.

2. A porous silica granule as claimed in claim 1, wherein the water content thereof is a maximum of about 1% by weight.

3. A porous silica granule as claimed in claim 1, wherein the particle diameter of the porous silica granule is in a range of from 50 to 800 μm.

4. A method for producing porous silica granules, comprising dispersing a fumed silica obtained by hydrolysis of a silicon compound into pure water to obtain a slurry having a solid concentration of from 50 to 80% by weight; controlling the pH value of the slurry to a range of from 1 to 4; and, while stirring, drying the slurry until the water content thereof is a maximum of about 20% by supplying a heated dying gas to obtain the porous silica granules.

5. A method as claimed in claim 4, wherein the drying gas is supplied to the slurry until the water content thereof is a maximum of about 1%.

6. A method claimed in claim 4, wherein the drying gas is heated to a temperature range of from 80 to 150° C.

7. A method as claimed in claim 4, wherein the particle diameter of the fumed silica is a maximum of about 4 μm or less.

8. A method as claimed in claim 4, wherein the solid concentration of the slurry is in a range of from 60 to 70% by weight, the pH value is in a range of from 2 to 3.

9. A method as claimed in claim 4, wherein the rate of evaporating water by supplying heated gas is 50 g/hour or lower per 1 kg of the initial slurry.

10. A method as claimed in claim 4, wherein the porous silica is classified in a classification step.

11. A method as claimed in claim 10, wherein the particle diameter of the silica granule obtained by classification is in a range of from 180 to 500 μm.

12. A method as claimed in claim 4, wherein a silicon compound free from carbon atoms is used.

13. A method for producing a porous silica granule according to claim 1 comprising preparing a wet gel body by reacting high purity alkoxysilane with water; drying the resulting body and size-reducing it thereafter; and applying a purification treatment.

14. A method for producing high purity synthetic quartz glass powder by using porous silica granules of claim 1, comprising a step of heat treatments, comprising performing a first heat treatment by heating said silica granules in a temperature range of from 150 to 300° C. under an oxygen-containing atmosphere, a second heat treatmrent of heating in a temperature range of from 600 to 1100° C., and a third heat treatment in a temperature range of from 1100 to 1300° C. under an atmosphere containing hydrogen chloride; and a a step of densification, comprising calcining the silica granules at a temperature not higher than 1500° C. under vacuum or in an atmosphere of gaseous hydrogen or gaseous helium.

15. A method for producing high purity synthetic quartz glass powder by using porous silica granule of claim 2, comprising a step of heat treatments, comprising performing a first heat treatment by heating said silica granules in a temperature range of from 150 to 300° C. under an oxygen-containing atmosphere, a second heat lreatment of heating in a temperature range of from 600 to 1100° C. and a third heat treatment in a temperature range of from 1100 to 1300° C. under an atmosphere containing hydrogen chloride; and a step of densification, comprising calcining the silica granules at a temperature not higher than 1500° C. under vacuum or in an atmosphere of gaseous hydrogen or gaseous helium.

16. A method for producing high purity synthetic quartz glass powder by using porous silica granules of claim 3, comprising a step of heat treatments, comprising performing a first heat treatment by heating said silica granules in a temperature range of from 150 to 300° C. under an oxygen-containing atmosphere, a second heat treatment of heating in a temperature range of from 600 to 1100° C., and a third heat treatment in a temperature range of from 1100 to 1300° C. under an atmosphere containing hydrogen chloride: and a step of densification, comprising calcining the silica granules at a temperature not higher than 1500° C. under vacuum or in an atmosphere of gaseous hydrogen or gaseous helium.

17. A method for producing high purity synthetic quartz glass powder by using porous silica granules obtained by the production method as claimed in claim 4, comprising a step of heat treatments, comprising performing a first heat treatment by heating said silica granules in a temperature range of from 150 to 300° C. under an oxygen-containing atmosphere, a second heat treatment of heating in a temperature range of from 600 to 1100° C., and a thircd heat treatment in a temperature range of from 1100 to 1300° C. under an atmosphere containing hydrogen chloride; and a step of densification, comprising calcining the silica granules at a temperature not higher than 1500° C. under vacuum or in an atmosphere of gaseous hydrogen or gaseous helium.

18. A method for producing high purity synthetic quart glass powder by using porous silica granules obtained by the production method as claimed in claim 5, comprising a step of heat treatments, comprising performing a first heat treatment by heating said silica granules in a temperature range of from 150 to 300° C. under an oxygen-containing atmosphere, a second heat treatment of heating in a temperature range of from 600 to 1100° C., and a third heat treatment in a temperature range of from 1100 to 1300° C. under an atmosphere containing hydrogen chloride; and a step of densification, comprising calcining the silica granules at a temperature not higher than 1500° C. under vacuum or in an atmosphere of gaseous hydrogen or gaseous helium.

19. A method for producing high purity synthetic quartz glass powder by using porous silica granules obtained by the production method as claimed in claim 6, comprising a step of heat treatments, comprising performing a first heat treatment by heating said silica granules in a temperature range of from 150 to 300° C. under an oxygen-containing atmosphere, a second heat treatment of heating in a temperature range of from 600 to 1100° C., and a third heat treatment in a temperature range of from 1100 to 1300° C. under an atmosphere containing hydrogen chloride; and a step of densification, comprising calclning the silica granules at a temperature not higher than 1500° C. under vacuum or in an atmosphere of gaseous hydrogen or gaseous helium.

20. A method for producing high purity synthetic quartz glass powder by using porous silica granules obtained by the production method as claimed in claim 7, comprising a step of heat treatments, comprising performing a first heat treatment by heating said silica granules in a temperature range of from 150 to 300° C. under an oxygen-containing atmosphere, a second heat treatment of heating in a temperature range of from 600 to 1100° C., and a third heat treatment in a temperature range of from 1100 to 1300° C. under an atmosphere containing hydrogen chloride; and a step of densification, comprising calcining the silica granules at a temperature not higher than 1500° C. under vacuum or in an atmosphere of gaseous hydrogen or gaseous helium.

21. A method for producing high purity synthetic quartz glass powder by using porous silica granules obtained by the production method as claimed in claim 8, comprising a step of heat treatments, comprising performing a first heat treatment by heating said silica granules in a temperature range of from 150 to 300° C. under an oxygen-containing atmosphere, a second heat treatment of heating in a temperature range of from 600 to 1100° C., and a third heat treatment in a temperature range of from 1100 to 1300° C. under an atmosphere containing hydrogen chloride; and a step of densirication, comprising calcining the silica granules at a temperature not higher than 1500° C. under vacuum or in an atmosphere of gaseous hydrogen or gaseous helium.

22. A method for producing high purity synthetic quartz glass powder by using porous silica granules obtained by the production method as claimed in claim 9, comprising a step of heat treatments, comprising performing a first heat treatment by heating said silica granules in a temperature range of from 150 to 300° C. under an oxygen-containing atmosphere, a second heat treatment of heating in a temperature range of from 600 to 1100° C., and a third heat treatment in a temperature range of from 1100 to 1300° C. under an atmosphere containing hydrogen chloride; and a step of densification, comprising calcining the silica granules at a temperature not higher than 1500° C. under vacuum or in an atmosphere of gaseous hydrogen or gaseous helium.

23. A method for producing high purity synthetic quartz glass powder by using porous silica granules obtained by the production method as claimed in claim 10, comprising a step of heat treatments, comprising performing a first heat treatment by heating said silica granules in a temperature range of from 150 to 300° C. under an oxygen-containing atmosphere, a second heat treatment of heating in a temperature range of from 600 to 1100° C., and a third heat treatment in a temperature range of from 1100 to 1300° C. under an atmosphere containing hydrogen chloride; and a step of densification, comprising calcining the silica granules at a temperature not higher than 1500° C. under vacuum or in an atmosphere of gaseous hydrogen or gaseous helium.

24. A method for producing high purity synthetic quartz glass powder by using porous silica granules obtained by the production method as claimed in claim 11, comprising a step of heat treatrnents, comprising performing a first heat treatment by heating said silica granules in a temperature range of from 150 to 300° C. under an oxygen-containing atmosphere, a second heat treatment of heating in a temperature range of from 600 to 1100° C., and a third heat treatment in a temperature range of from a step of densification, comprising calcining the silica granules at a temperature not higher than 1500° C. under vacuum or in an atmosphere of gaseous hydrogen or gaseous helium.

25. A method for producing high purity synthetic quartz glass powder by using porous silica granules obtained by the production method as claimed in claim 12, comprising a step of heat treatments, comprising performing a first heat treatment by heating said silica granules in a temperature range of from 150 to 300° C. under an oxygen-containing atmosphere, a second heat treatment of heating in a temperature range of from 600 to 1100° C., and a third heat treatment in a temperature range of from 1100 to 1300° C. under an atmosphere containing hydrogen chloride; and a step of densification, comprising calcining the silica granules at a temperature not higher than 1500° C. under vacuum or in an atmosphere of gaseous hydrogen or gaseous helium.

26. A method for producing high purity synthetic quartz glass powder by using porous silica granules obtained by the production method as claimed in claim 13, comprising a step of heat treatments, comprising performing a first heat treatment by heating said silica granules in a temperature range of from 150 to 300° C. under an oxygen-containing atmosphere, a second heat treatment of heating in a temperature range of from 600 to 1100° C., and a third heat treatment in a temperature range of from 1100 to 1300° C. undefr an atmosphere containing hydrogen chloride; and a step of densification, comprising calcining the silica granules at a temperature not higher than 1500° C. under vacuum or in an atmosphere of gaseous hydrogen or gaseous helium.

27. A method as claimed in claim 14, wherein the calcining is performed in the temperature range of from 1300 to 1500° C.

28. Method as claimed in claim 14, wherein calcining comprises performing bubbling fluidization of said porous silica granules by supplying gaseous helium and calcining thereof in a temperature range of from 1300 to 1600° C.

29. Method as claimed in claim 28, wherein gaseous helium is supplied after it is heated to at least 600° C.

30. Method claimed in claim 28, wherein gaseous helium is circulated.

31. Method claimed in claim 29, wherein gaseous helium is circulated.

32. A method for producing high purity synthetic quartz glass, comprising fusing and vitrifying the high purity synthetic quartz glass powder obtained by the production method claimed in claim 13.

33. A method for producing high purity synthetic quartz glass, comprising fusing and vitrifying the high purity synthetic quartz glass powder obtained by the production method claimed in claim 14.

34. A method for producing high purity synthetic quartz glass, comprising fusing and vitrifying the high purity synthetic quartz glass powder obtained by the production method claimed in claim 27.

35. A method for producing high purity synthetic quartz glass, comprising fusing and vitrifying the high purity synthetic quartz glass powder obtained by the production method claimed in claim 28.

36. A method for producing high purity synthetic quartz glass, comprising fusing and vitrifying the high purity synthetic quartz glass powder obtained by the production method claimed in claim 29.

37. A method for producing high purity synthetic quartz glass, comprising fusing and vitrifying the high purity synthetic quartz glass powder obtained by the production method claimed in claim 30.

38. A method for producing a porous silica granule approximately spherical in shape, having a carbon concentration of less than 1 wt.-ppm, a pore volume of 0.5 $cm^3$ or less per 1 gram of the granules, a mean diameter of pores of 50 nm or less, a specific surface area of 100 $m^2$/g or less, and a bulk density of 0.7 $g/cm^3$ or higher, comprising dispersing a fumed silica obtained by hydrolysis of a silicon compound into water to obtain a slurry, and drying.

39. The method according to claim 38, wherein the silica obtained by hydrolysis of a silicon compound is dispersed into pure water to obtain a slurry having a solid concentration of from 50 to 80% by weight; further comprising the steps of controlling the pH value of the slurry to a range of from 1 to 4; and, while stirring, drying the slurry until the water content thereof is a maximum of about 20% by supplying a heated dying gas to obtain the porous silica granules.

40. A porous silica granule produced according to the method of claim 4, which is approximately spherical in shape, having a carbon concentration of less than 1 wt.-ppm, a pore volume of 0.5 $cm^3$ or less per 1 gram of the granules, a mean diameter of pores of 50 nm or less, a specific surface area of 100 $m^2$/g or less, and a bulk density of 0.7 $g/cm^3$ or higher.

* * * * *